United States Patent
Konig et al.

(10) Patent No.: US 7,487,094 B1
(45) Date of Patent: Feb. 3, 2009

(54) SYSTEM AND METHOD OF CALL CLASSIFICATION WITH CONTEXT MODELING BASED ON COMPOSITE WORDS

(75) Inventors: Yochai Konig, San Francisco, CA (US); Hernan Guelman, San Francisco, CA (US)

(73) Assignee: Utopy, Inc., San Francisco, CA (US)

( * ) Notice: Subject to any disclaimer, the term of this patent is extended or adjusted under 35 U.S.C. 154(b) by 800 days.

(21) Appl. No.: 10/871,181

(22) Filed: Jun. 18, 2004

Related U.S. Application Data

(60) Provisional application No. 60/534,994, filed on Jan. 9, 2004, provisional application No. 60/479,861, filed on Jun. 20, 2003.

(51) Int. Cl.
  *G10L 11/00* (2006.01)
  *G10L 15/00* (2006.01)
  *H04M 1/64* (2006.01)
(52) U.S. Cl. .................... 704/270; 704/240; 379/88.04; 379/88.01
(58) Field of Classification Search ........................ None
  See application file for complete search history.

(56) References Cited

U.S. PATENT DOCUMENTS

| | | | | |
|---|---|---|---|---|
| 4,852,180 | A | 7/1989 | Levinson | 704/256 |
| 5,625,748 | A | 4/1997 | McDonough et al. | 704/251 |
| 6,404,857 | B1 | 6/2002 | Blair et al. | 379/67.1 |
| 6,542,602 | B1 | 4/2003 | Ealzar | 379/265.06 |
| 6,594,629 | B1 | 7/2003 | Basu et al. | 704/251 |
| 6,678,658 | B1 | 1/2004 | Hogden et al. | 704/243 |
| 6,687,671 | B2 | 2/2004 | Gudorf et al. | 704/235 |
| 6,724,887 | B1 | 4/2004 | Eilbacher et al. | 379/265.03 |
| 7,092,888 | B1 * | 8/2006 | McCarthy et al. | 704/277 |
| 2003/0088403 | A1 * | 5/2003 | Chan et al. | 704/213 |
| 2004/0024598 | A1 * | 2/2004 | Srivastava et al. | 704/235 |

OTHER PUBLICATIONS

Sue Johnson, "Describe what is meant by the term "keyword spotting" and describe the techniques used to implement such a recognition system," Mphil Computer Speech and Language Processing Speech Recognition Essay, Apr. 24, 1997.
A. Koutras et al., "Blind Speech Separation of Moving Speakers in Real Reverberant Environments," WCL, Electrical & Computer Engineering Department, University of Patras, 26100 Patras, HELLAS.

* cited by examiner

*Primary Examiner*—David R Hudspeth
*Assistant Examiner*—Matthew J Sked
(74) *Attorney, Agent, or Firm*—Lumen Patent Firm

(57) ABSTRACT

A system and method of automatically classifying a communication involving at least one human, e.g., a human-to-human telephone conversation, into predefined categories of interest, e.g., "angry customer, etc. The system automatically, or semi-automatically with user interaction, expanding user input into semantically equivalent events. The system recognizes these events, each of which is given a confidence level, and classifies the telephone conversation based on an overall confidence level. In some embodiments, a different base unit is utilized. Instead of recognizing individual words, the system recognizes composite words, each of which is pre-programmed as an atomic unit, in a given context. The recognition includes semantically relevant composite words and contexts automatically generated by the system. The composite words based contextual recognition technique enables the system to efficiently and logically classifying and indexing large volumes of communications and audio collections such as call center calls, Webinars, live news feeds, etc.

37 Claims, 8 Drawing Sheets

| VERIFY SYNONYMS | | | |
|---|---|---|---|
| Original Phrase: | I want to test drive a car. | | |
| Keyword: | Test | Drive | Car |
| Synonyms: | ☑ Exam<br>☑ Try out<br>☑ Trial<br>☑ Check | ☑ Motivation<br>☑ Maneuver<br>☑ Fundraiser<br>☑ Steer | ☑ Auto<br>☑ Vehicle<br>☑ Sedan<br>☑ Coupe |
| | [___] ADD | [___] ADD | [___] ADD |

Please uncheck any undesired synonyms, then click "finish".

BACK  CANCEL  FINISH

*Figure 7*

| PHRASE SUMMARY | | | |
|---|---|---|---|
| PARAMETERS USED: | | | |
| Original Phrase: | I want to test drive a car. | | |
| Keywords Used: | Test | Drive | Car |
| Synonyms Used: | Exam<br>Try out<br>Trial<br>Check | Motivation<br>Maneuver<br>Fundraiser<br>Steer | Auto<br>Vehicle<br>Sedan<br>Coupe |

SAMPLE OF PHRASES GENERATED BY SMART:

I want to try out an auto.
I want to check and steer a vehicle
I want to maneuver a coupe.

⦿ Accept Phrases
○ Manually Edit Parameters

BACK  CANCEL  OK

SYSTEM AND METHOD OF CALL CLASSIFICATION WITH CONTEXT MODELING BASED ON COMPOSITE WORDS

CROSS-REFERENCE TO RELATED APPLICATIONS

This application claims priority from the U.S. Provisional Patent Application Nos. 60/479,861, filed Jun. 20, 2003, 10/630,944, filed Jul. 28, 2003, and 60/534,994, filed Jan. 9, 2004, the contents of which are incorporated herein by reference. This application relates to two U.S. patent applications concurrently filed herewith, entitled "SYSTEM AND METHOD OF CALL CLASSIFICATION" and "SYSTEM AND METHOD FOR SEARCHING, INDEXING, AND CLASSIFYING MULTIMEDIA FILES, AUDIO/SPEECH CONVERSATIONS, MEETINGS AND NEWS BROADCASTS."

FIELD OF THE INVENTION

The present invention generally relates to data processing and analysis. More particularly, it relates to a computer-implemented system and method of automatically classifying a communication involving at least one human, for instance, a human-to-human telephone conversation.

DESCRIPTION OF THE BACKGROUND ART

In the commercial world, the telephone remains a main venue for customers to interact with business entities, companies, organizations, and the like. An example of such an interaction is that a customer calls and talks with a human agent or representative that speaks on behalf of an organization. Naturally, companies are interested in analyzing the content as well as context of these conversations to suit their needs, for instance, providing a better customer service, training a new employee, and so on. Similar needs exist for governmental agencies, for example, intercepting telephone conversations between individuals and detecting unlawful activities based on the content and context of the conversations.

Today, the only way to gain an insight into these conversations is by humans who are trained to listen and to classify the calls manually. This type of tedious human review is extremely costly, inefficient, and burdensome.

The problem of manual processing telephone conversations is compounded when the volume of the calls is large or substantial. In part this is because traditional speech-to-text recognition technologies focus on full transcription. That is, each and every spoken word is converted into a corresponding written word (text) and all relevant operations are then performed on the resulting text. An exemplary speech processing technology based on full transcriptions of stored audio data can be found in the U.S. Pat. No. 6,687,671, entitled "METHOD AND APPARATUS FOR AUTOMATIC COLLECTION AND SUMMARIZATION OF MEETING INFORMATION."

The basic principle of the full transcription approach, i.e., concentrating on recognizing individual words, affects both the underlying language model as well as its corresponding search recognition algorithms. As such, this approach is computationally expensive and not accurate. Furthermore, it requires estimating a language model for every arbitrary audio file, which is a very daunting task indeed. Unfortunately, after all the efforts, the task of figuring out the relevancy of the recognition result remains.

In the literature, in addition to the full transcription approach, there are several principal ways to search, index, and categorize large audio collections. For example, the phonetic transcription approach performs phonetic transcription only. That is, instead of converting the entire speech stream into a corresponding text sequence, the audio stream is converted into a phone sequence such as "b, d, a." As such, an audio file is converted into a string of phonemes and indexed accordingly. In search time, the user query is also converted into a phoneme string to find the best matches. An exemplary speech recognition technology based on phonetic transcriptions of stored audio data can be found in the U.S. Pat. No. 4,852,180, entitled "SPEECH RECOGNITION BY ACOUSTIC/PHONETIC SYSTEM AND TECHNIQUE." Another example is NEXminer by Nexidia Inc. of Atlanta, Ga., USA, which offers a phonetic transcription based audio-video intelligent mining technology that provides audio-video (AV) contents analysis, indexing, archiving, searching, monitoring, notification, intelligent mining and extracting knowledge.

Although the phonetic transcription approach is relatively fast, it ignores the notion of words and their context, which is a key ingredient for accurate speech recognition, resulting in significantly inaccurate transcription. Furthermore, the search results do not reflect the importance and the relevancy of the overall audio file to the user search and classification request, since it is based solely on the assumed appearance of certain word or words.

Another approach is word spotting, i.e., to pre-select a set of words and try to recognize only their appearance in the audio files of interest. This approach does not allow the user to perform searches on any arbitrary input. Only words that had been previously specified are subject to word spotting. Exemplary teachings on the word spotting approach can be found in the U.S. Pat. No. 5,625,748, entitled "TOPIC DISCRIMINATOR USING POSTERIOR PROBABILITY OR CONFIDENCE SCORES" and the following articles, J. R. Rohlicek, W. Russell, S. Roukos, and H. Gish; "Continuous Hidden Markov Modeling for Speaker-Independent Word Spotting", IEEE ICASSP, 1989, pp. 627-630, J. R. Rohlicek, P. Jeanrenaud, K. Ng, H. Gish, et al. "Phonetic Training and Language Modeling for Word Spotting" IEEE ICASSP, 1993, volume II, pp. 459-462, and P. Jeanrenaud, M. Siu, K. Ng. R. Rohlicek, and H. Gish; "Phonetic-based Word Spotter: Various Configurations and Application to Event Spotting"; in ESCA Eurospeech, 1993, Volume II, pp 1057-1060.

Similar to the full transcription and phonetic transcription approaches described above, the search results generated by the word spotting approach usually do not reflect the importance and/or the relevancy of the overall audio file with respect to the user search and classification request. Again, this approach is solely based on the assumed appearance on certain word or words.

All the previous approaches share the concept of separating the recognition stage (i.e., transforming audio information received or recorded into some form of textual information) from the interpretation, classification, and relevancy estimation stage that is supposed to take the output of the previous recognition stage or phase as input.

In view of the foregoing, there is a continuing need in the art for an accurate, efficient and intelligent communication information processing and classification method and system useful for searching, indexing, and classifying multimedia files, audio/speech conversations, particularly communications involving at least one human, meetings, Webinars, live news feed/broadcasts, and the like. The present invention addresses this need.

SUMMARY OF THE INVENTION

The present invention is a new audio/speech/multimedia information processing technology that enables a machine, i.e., a computer, to automatically, quickly, efficiently, and accurately process, index, categorize, or otherwise classify communications involving at least one human, for instance, human-to-human conversations over telephone lines. The categories of interest can be pre-defined or readily amended at the convenience of an authorized user such as an administrator or a manager of a company.

An important aspect of the invention is that the system automatically, or if desired, semi-automatically with user interaction, translates and expands user input into semantically equivalent events to look for in the conversations. These events are either linguistic or non-linguistic. Exemplary linguistic events include words, phrases, and sentences. Exemplary non-linguistic events include silence, tone, and pitch.

In some embodiments, a call classification system embodies a word spotting technique to detect the occurrence or non-occurrence of events. Each event is given a confidence level between 0 and 1 accordingly. The call classification system ultimately classifies the communication at issue according to an overall confidence level. In these embodiments, a single word is the basic unit and only a fixed set of words and phrases are recognized. Words that are not required to be recognized are mapped into one shared word model, often termed "garbage model."

In some embodiments, a class classification system embodies a context modeling based on a different unit that we term as "sequence" or "composite words." That is, in these embodiments, the basic unit is a sequence of words, from one word to several consecutive words in sequence. All our modeling and criteria are based on making a detection decision at once on a sequence of words, instead of one word at a time. These modeling and criteria include category definition, acoustic modeling, language modeling, search algorithm, optimality criterion, and confidence estimation. A computational efficient implementation of an embodiment is described herein.

As discussed before, existing approaches are not well suited for searching, indexing, and categorizing large audio collections such as call center calls and multimedia news feeds. To address this issue, in some embodiments, the present invention further embeds an innovative functionality in a communication information processing system. An important aspect of the invention is that this functionality integrates, i.e., essentially unifies, the recognition stage and the interpretation/classification/indexing stage by extracting content directly from the audio/speech/multimedia files. All the knowledge and data that are required to perform at the interpretation phase are being utilized in the recognition phase to insure an overall better and more accurate process.

Still further advantages and features of the present invention will become apparent to one skilled in the art upon reading and understanding the drawings and detailed description as set forth below.

BRIEF DESCRIPTION OF THE DRAWINGS

FIG. 7 is an exemplary user interface showing the result of the semantic expansion and enabling a user to select/deselect/add synonyms to the keywords of FIG. 6, implementing an embodiment of the present invention.

FIG. 8 is an exemplary user interface showing system-generated phrases, incorporating the user input of FIG. 7.

DETAILED DESCRIPTION

Definitions

Audio Features—extractable non-linguistic features that are not related to the linguistic content of the conversation, for example, speaker turn changes, pitch modulation, type of channel, signal-to-noise ratio (SNR), silence, and predefined tones such as question, sarcasm, and disbelief.

Category—a class, type, kind, sort, group, or the like defined by a list of words or phrases, audio features, and a set of rules. A category can have a logical relationship with another category. For example, the category of "angry customer" could be a sub-category of the "dissatisfied customer" category and/or a super-category of the "suing customer" category.

Category Prior—refers to the relative size of a category to the size of the entire domain, or the percentage of all, for example, calls, conversations, live streams, files, and the likes, from the entire domain that are related to the category.

Classification Rules—a list of decision-making rules on whether a call, conversation, file, audio stream, or the like (depending on application) is related or not related to a category. In some embodiments, the rules are based on the existent or absence of words from the list of words or phrases and existence or absence of audio features.

False Positive—calls, conversations, live streams, files, and the likes that have been classified as being related to a category when in fact they are not related.

False Negative—calls, conversations, live streams, files, and the likes that have been classified as being not related to a category when in fact they are related.

Confidence Level—A number between 0 and 1 that represents the confidence level in the classification. For example, a number of 0.9 means that by our estimate the classification is accurate in 90% of the cases. Mathematically, for events A, B, and C to occur, we express the confidence (i.e., probability) that all of them will occur as $P(A,B,C)=P(C|B,A)P(B|A)P(A)$.

Figure 2:
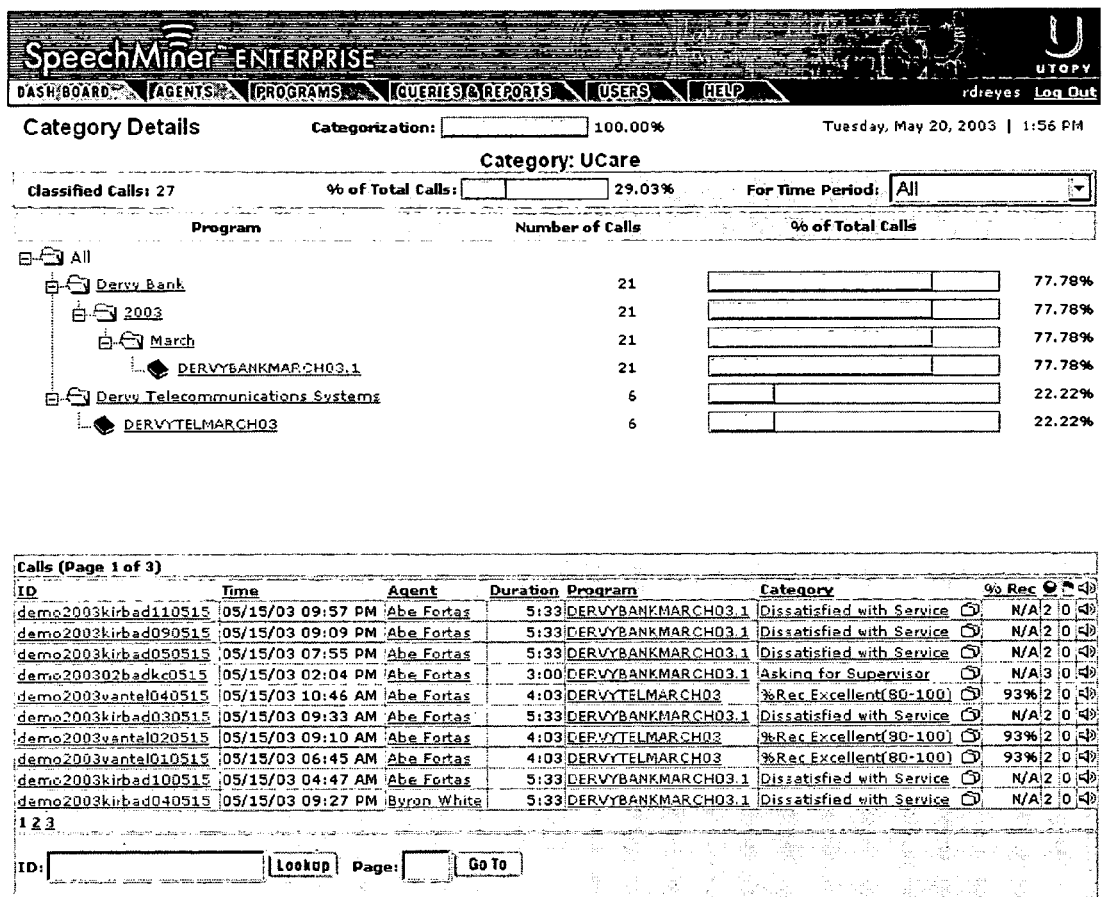
FIG. 2 is a screen shot of a web browser page, i.e., a user interface "Dashboard" showing a list of calls belonging to the "Ucare" category, implementing an embodiment of the present invention.
Figure 3:
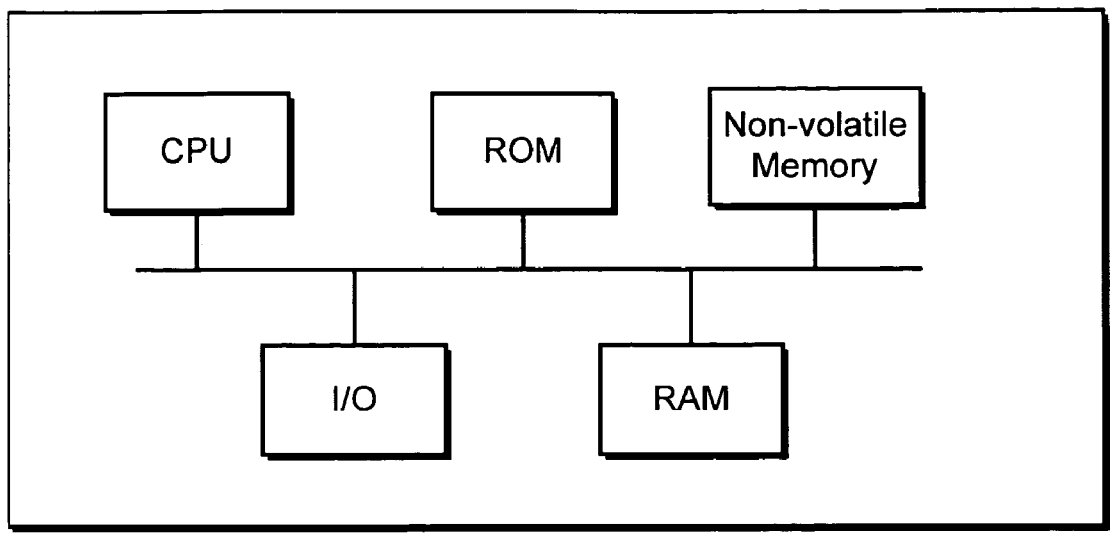
FIG. 3 is a block diagram of an exemplary computer system embodying the present invention.
Figure 4:
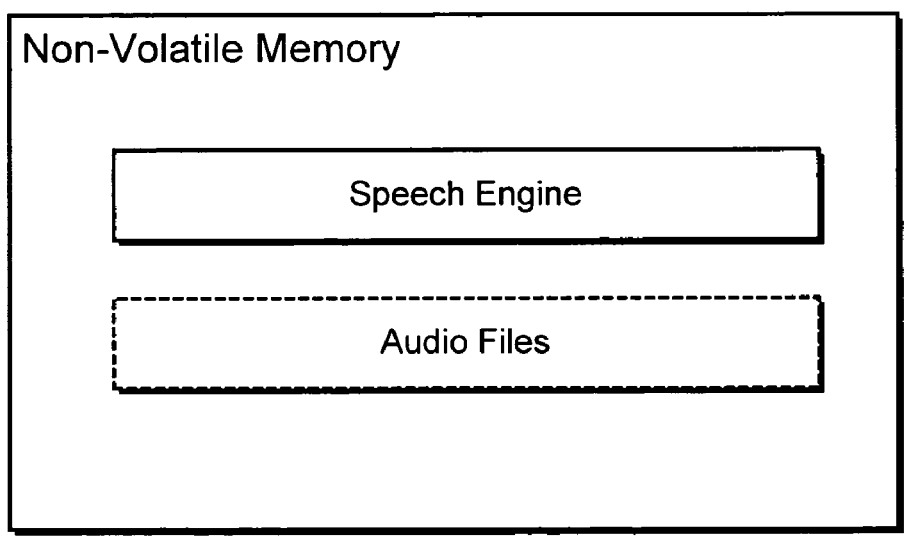
FIG. 4 is a block diagram of an exemplary non-volatile memory residing in the computer system of FIG. 3.

As one skilled in the art will appreciate, the present invention is not limited to human-to-human phone conversations and can be readily implemented to classify different types of communications according to needs and applications. According to an aspect of the invention, a communication classification system is embodied in a computer system having a software component and a hardware component. The software component includes a classification software package and a Web browser application. The classification software package includes a graphical user interface enabling users to interact with the classification system via the Web browser, as exemplified in FIGS. 1 and 2. FIG. 3 shows an exemplary hardware component having a central processing unit (CPU), a read-only memory (ROM), an input/output controller (I/O), a random-access memory (RAM), and a non-volatile memory. FIG. 4 shows an exemplary non-volatile memory storing a speech engine and audio files implementing the present invention.

Below describes an embodiment of the present invention particularly useful in classifying human-to-human conversations over the telephone lines. As one skilled in the art will appreciate, the present invention is not limited to human-to-human phone conversations and can be readily implemented to classify different types of communications according to needs and applications.

As discussed above, to gain an insight into the calls, companies generally employ a tedious procedure having humans listening to the calls and classifying the calls accordingly. With the present invention, the calls are automatically classified. Alternatively, if so desired, the calls can be semi-automatically classified with user input. Thus, to gain an insight into the calls, an end user, such as a corporate manager or anyone authorized to analyze the calls, can simply open a browser window, log in to his/her dashboard, and review the details of the calls.

Figure 1:
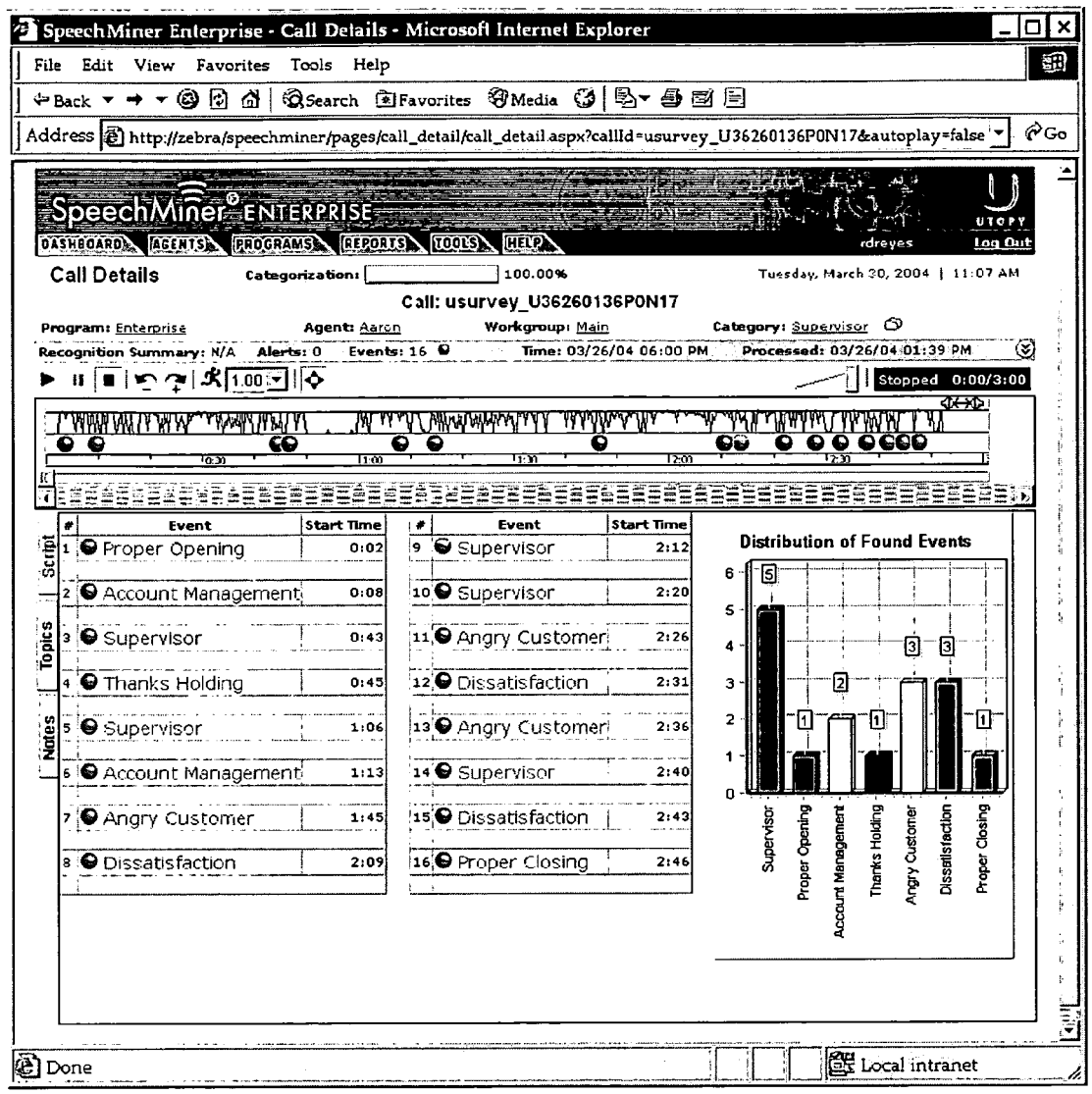
FIG. 1 is a screen shot of a web browser page, i.e., a user interface "Dashboard" showing call details in the "Supervisor" category, implementing an embodiment of the present invention.

FIG. 1 is screen shot of a "Dashboard" page showing call details in the "Supervisor" category. FIG. 2 is a screen shot of a "Dashboard" page showing category details with a list of calls belonging to the "Ucare" category. FIG. 1 further illustrates how events can be charted on a typical audio wave file with a timeline. If certain events cannot be verified to a sufficient confidence level, then a person reviewing the call is enabled to jump to or select the specific event in question and review the event directly. This way, the reviewer is not required to review an entire telephone conversation. Only selected portions that do not pass or achieve a certain confidence level. The requirement or threshold for the confidence level can be pre-set by the system or customized by an authorized user of the system, e.g., a system administrator.

According to needs and applications, the classification process described below can be transparent to the end user. Alternatively, it can be tailored to allow user customization and/or modification. Furthermore, the classification system can be implemented in a client-server architecture or packaged as a stand-alone product. The programming techniques necessary to realize these implementations are known in the art and thus are not further described herein.

1. Category Generation

Figure 5:
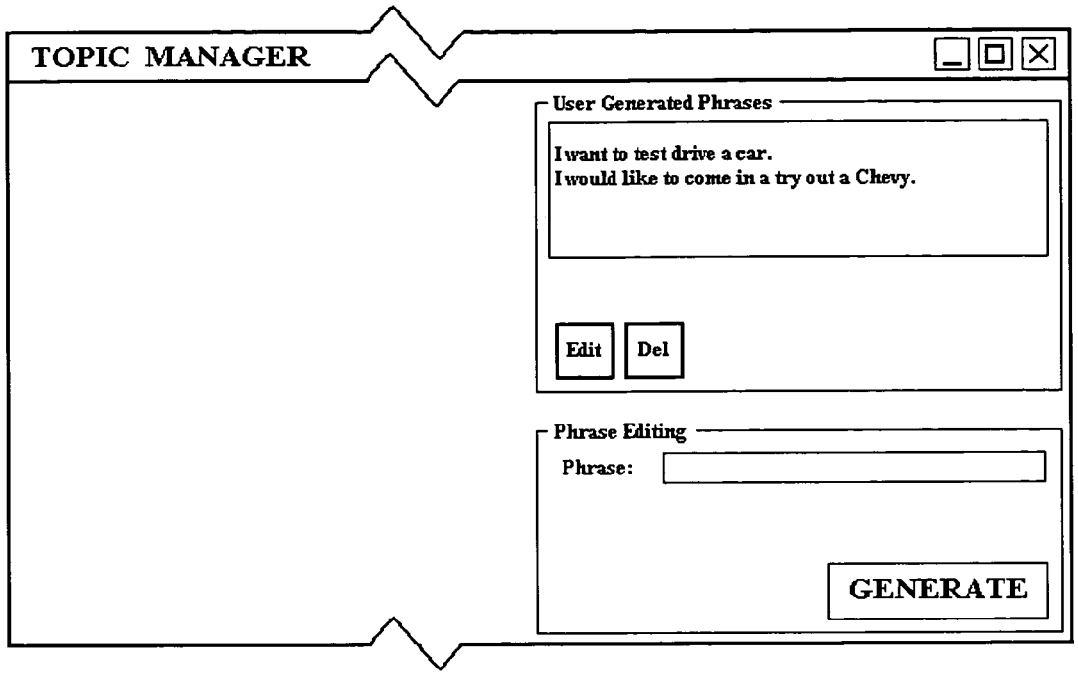
FIG. 5 shows an exemplary user interface enabling a user to enter/edit/generate phrases, implementing an embodiment of the present invention.

FIG. 5 shows an exemplary user interface, in this case, a topic manager, that allows a user to define a category in terms of events expressed in words or phrases. In this exemplary embodiment, these are linguistic events, although non-linguistic events are possible.

According to the present invention, a user enters one or more words separated by space in each line. When done, e.g., the user selects the "Generate" button, the system automatically generates synonyms, i.e., words or phrases that are semantically equivalent to the words or phrases provided by the user. The semantic meaning of a category is the union of all user-entered phrases and system-generated phrases. Thus, the user entries under one topic/category are not independent. Any insight such as keywords and other information gained from the user via wizard style question-answering session are used to interpret each new phrase. In some embodiments, the system is programmed to ask the user follow-up questions on each input to learn about other phrases or words with which to interpret the user-entered words or phrases. The semantic expansion process is further described below.

2. Semantic Expansion

The system performs semantic expansion of the user input via the following steps:

Finding Keywords

For every user-entered phrase, the system looks for informative words. Preferably, the system implements the TFIDF measure described in Ricardo Baeza-Yates and Berthier Ribeiro-Neto, *Modern Information Retrieval*, Addison Wesley, 1999, in which TF stands for term frequency, and IDF stands for inverse document (in some embodiments, "document" means "conversation") frequency.

Mathematically, if $f_{u,w}$ denotes the frequency of the word w in category u documents, and $D_w$ denotes the number of documents containing the word w in all conversations, then the importance of a word w to a category u is proportional to the product $f_{u,w} \cdot D/D_w$. For every user-entered phrase the system computes the TFIDF of each word and those with the highest score would be considered the key words.

An alternate measure to compute to relevance of each word to the category of interest is based on computing the mutual information. Through the concept of mutual information, information theory provides the mathematical tools to quantify this intuition in a sound way. For a detailed explanation, see, T. Cover and J. Thomas, *Elements of Information Theory*, Wiley, 1991. In this embodiment of the informative measure, two indicator variables are defined. $I_w$ has a value of 1 when the word w appears in a conversation and 0 when it does not, and $I_u$ has a value of 1 when a conversation belongs to the category u and 0 when it does not. The mutual information between the two random variables $I_w$ and $I_u$ is defined as:

$$I(I_w; I_u) = \sum_{i_w \in I_w} \sum_{i_u \in I_u} P(i_w, i_u) \log \frac{P(i_w, i_u)}{P(i_w)P(i_u)}.$$

The probabilities in this formula are computed over a set of documents of belongs to the category u and a general set of documents.

Semantically Expanding the Keywords

For every keyword (i.e., semantically important word—meaning that this word or semantically equivalent word has to appear) identified from the user-entered phrases, the system expands it with semantically equivalent words. To make sure that the expansion matches the right sense for the semantically equivalent word (e.g., synonym), a knowledge base is consulted to check whether the words appear in a statistical sense in the same context.

A traditional N-GRAM language model can also be used to compute the statistical context, see, e.g., S. M. Katz "Estimation of probabilities from sparse data for the language model component of a speech recognizer." *IEEE Transactions on Acoustic, Speech and Signal Processing*, 35(3):400-401, 1987.

Syntactically Expanding the User-Entered Phrases

This process can generate semantically equivalent phrases from the user original phrases by changing the structure of the sentence, e.g., rearranging the sentence from a passive voice to an active voice, or vice versa. For instance, a sentence like "you are taking advantage of me" can be expanded to include an additional sentence "I'm being taking advantage of."

Lengthening the User-Entered Phrases

When a user-entered phrase is short, the system can generate longer phrases that preserve the semantic meaning of the short phrase. This can be done by adding words that precede or trail the original phrase and/or by adding words therein. For instance, if the user enters "I'm frustrated", the system expands it to "I'm really frustrated" and searches both accordingly.

Figure 6:
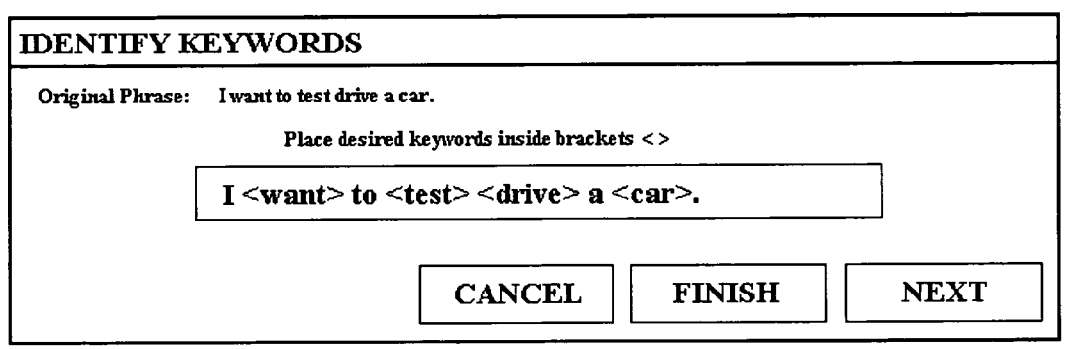
FIG. 6 shows an exemplary user interface enabling a user to identify/mark/select keywords, implementing an embodiment of the present invention.

FIG. 6 shows an exemplary user interface enabling a user to identify, mark, or select keywords. FIG. 7 shows the result of the semantic expansion on the original user-entered phrase shown in FIG. 6. The user can review, select, deselect, and/or add synonyms. FIG. 8 summarizes the user-entered phrases, user-marked keywords, synonyms to the keywords, and system-generated phrases.

Figure 9:
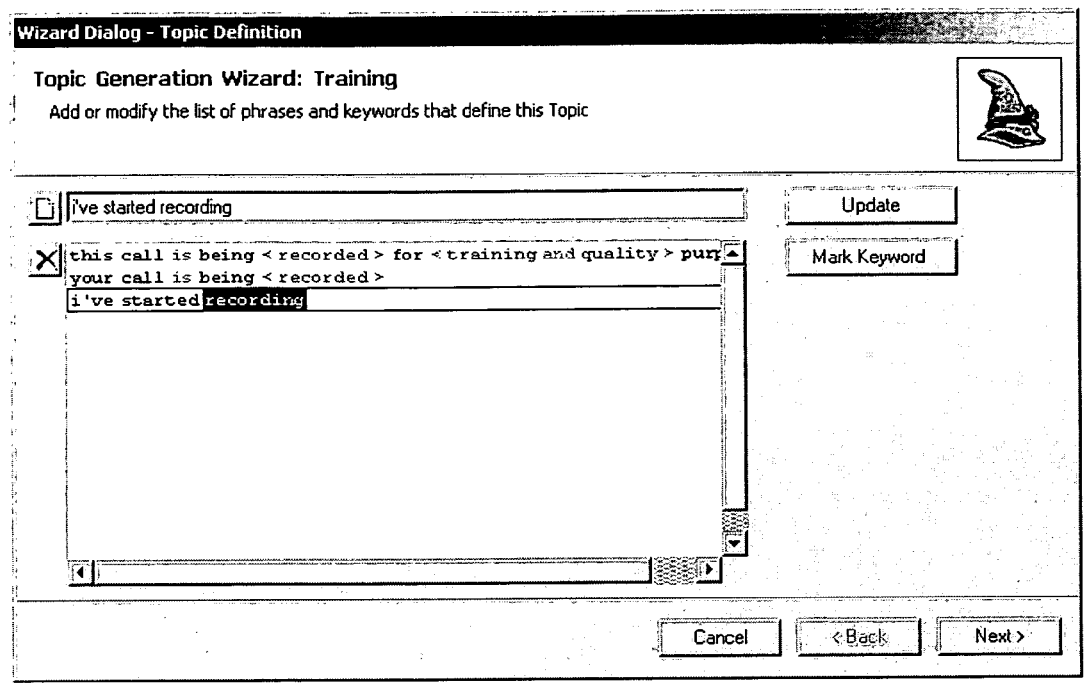
FIG. 9 is a screen shot of an exemplary user interface showing a topic/category generation wizard that enables a user to add or modify the list of phrases and keywords that define the category of "Training", implementing an embodiment of the present invention.
Figure 10:
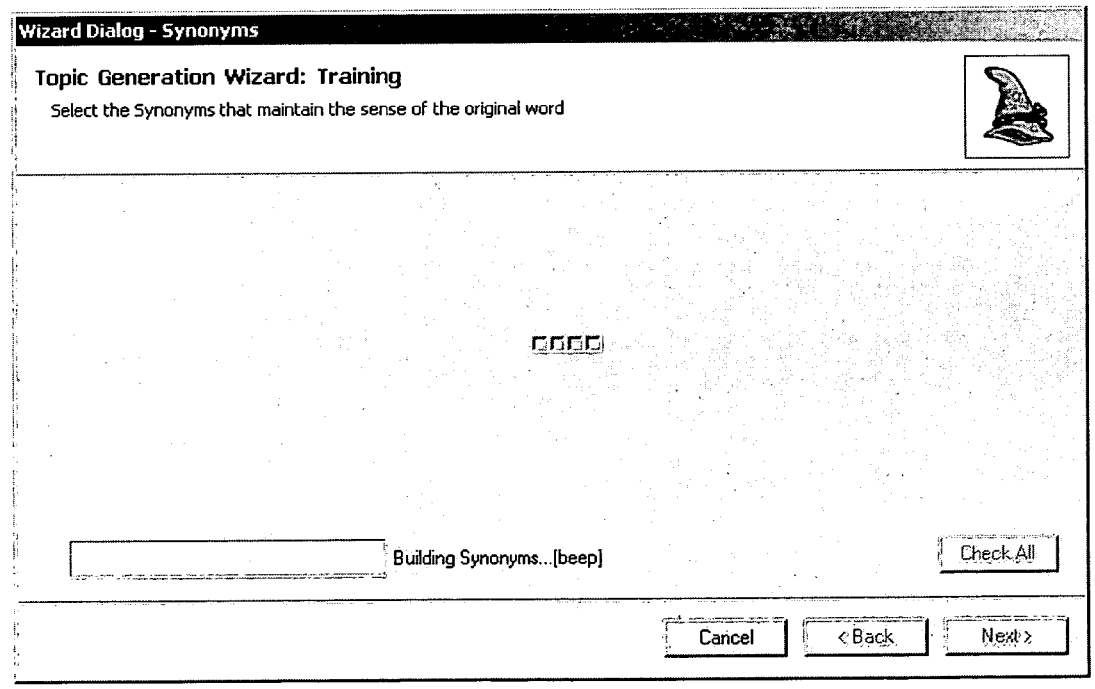
FIG. 10 is a screen shot of an exemplary embodiment showing that the system is building synonyms to semantically expanding the user input of FIG. 9.
Figure 11:
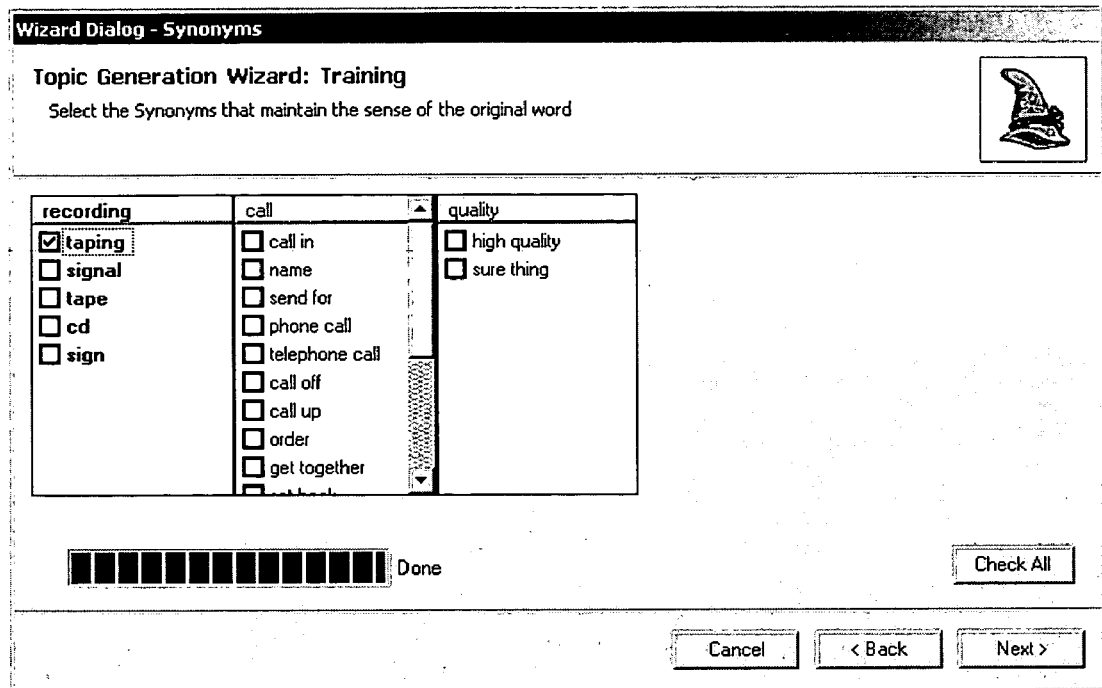
FIG. 11 is a screen shot of an exemplary embodiment similar to FIG. 7, showing the result of the semantic expansion of FIG. 10.
Figure 12:
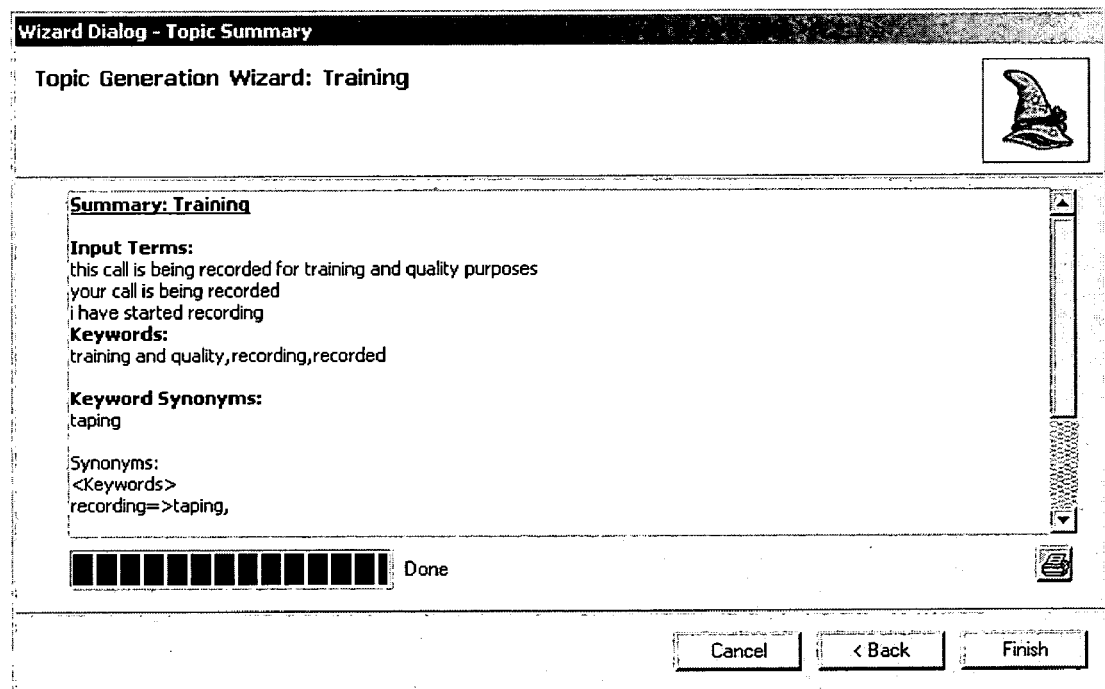
FIG. 12 is a screen shot of an exemplary embodiment similar to FIG. 8, showing the summary of the user input of FIG. 9, the keywords identified/selected in FIG. 11, and the system-generated synonyms.

FIG. 9 is a screen shot of an exemplary user interface showing a topic/category generation wizard that enables a user to add or modify the list of phrases and keywords that define the category of "Training". FIG. 10 is a screen shot showing that the system is building synonyms, thereby semantically expanding the user input of FIG. 9. FIG. 11 is a screen shot showing the result of the semantic expansion of FIG. 10. FIG. 12 is a screen shot showing the summary of the user input of FIG. 9, the keywords identified/selected in FIG. 11, and the system-generated synonyms. The system-generated phrases are outside of the screen boundary.

3. Event Detection by Word Spotting

In principle, to classify a conversation, the system looks for the user entered-phrases and the system-generated, semantically equivalent phrases directly in the conversation. In some embodiments, the invention implements a word spotting approach to detect events, see, e.g., Sue Johnson, "Describe What is Meant by the Term 'Keyword Spotting' and Describe the Techniques Used to Implement Such a Recognition System", MPhil thesis, Cambridge University, 1997, <<http://citeseer.nj.nec.com/49985.html>>. The word spotting approach is used in conjunction with voice recognition software. Various different types of voice recognition software exist and can be used to implement this invention.

Acoustic Separation of Speakers

In some embodiment, the system performs an acoustic separation of speakers of the conversation being classified. The acoustic speaker separation enables separating the agent and the customer and labeling the events spoken by the agent versus events spoken by the customer. In some cases, a first pass is performed to mark, associate, or state for each time frame whether it is correlated to Speaker A or Speaker B. After performing a recognition pass, it is possible to estimate if Speaker A is the agent or the customer based on any recognized events. Afterwards, the linguistic content of each speaker can be checked and classified accordingly. For an exemplary teaching on speaker separation, see, A. Koutras, E. Dermatas and G. Kokkinakis "Blind speech separation of moving speakers in real reverberant environments," ICASSP2000, 5-9 Jun., 2000, Istanbul, Turkey. <<http://citeseer.ist.psu.edu/280399.html>>.

Confidence Level Estimation

The system assigns a probability for every event and from it an overall confidence over the whole classification, thus enabling the fine-tuning of the classification decision based on dynamic cost function as well as the incorporation of prior information. In some embodiments, for every event a confidence level is assigned for each classification rule. The overall confidence level of the whole call is then computed using the Bayesian Statistical rules, see, P. Lee, Bayesian Statistics, *Oxford University Press*, 1989.

4. Event Detection and Recognition with Context Modeling based on Composite Words In some embodiments, the system utilizes a different unit that we term "composite word" or a sequence of words. Each composite word is pre-programmed as an atomic unit such that, if a composite word exists as a whole in a call or conversation, it is detected, thus eliminating partial detection. As further discussed below, this change in basic unit affects different modules comprised of the call classification system. Note that this binary detection is accompanied by a confidence level that specifies a probability that the whole event (i.e., the whole word sequence) occurs in the audio.

Language Modeling

The N-GRAM model referenced above approximates the probability of a sequence of words $W_1, \ldots, W_N$ occurring in a context C by assuming that only N previous words affect the prior probability of the current word. In reality, N is set to either 1 or 2, which creates sub-optimal situations in some cases:

- The estimation problem of estimating $O(W^N)$ probabilities where W is the number of words in the vocabulary and N is the order of the N-GRAM.
- The "short-term" memory of the grammar, i.e., the dependency on only the last word or two is unfavorable. Take, for example, the sentence "I can't take it any more". In estimating the prior probability for the word "more", the beginning of the sentence "I can't", which has a definitive effect on its ending "more", is forgotten or ignored. Consequently, the N-GRAM would give a significant probability to a sentence that is quite unlikely to happen, "I can take it any more."
- The N-GRAM language models are not well suited to deal with disfluencies such as repeated words, "hmm", and so forth that usually occur in informal conversational speech.

To address these shortcomings, the present invention directly estimates the probability of every sequence of words $W_1, \ldots, W_N$ occurring in a context C, i.e., $P(W_1, \ldots, W_N|C)$. Given the fact that we consider only a fixed set of sequences in any given context, the problem is tractable and can be estimated by calculating the relative frequencies of the events with appropriate smoothing techniques, given a finite set of training data.

The present invention can also extend/expand a given context to include relevant contexts of conversations in places with high likelihood calculated based on the results from earlier recognition stages.

Here, the context definition would include the entire topic and the settings/parameters found in the earlier stages such as a call from a dissatisfied customer with a Macintosh computer. As such, the language model would induce a probability distribution over all relevant word sequences conditioned on the call coming from a dissatisfied customer with a Macintosh computer.

A relevant context takes into consideration, for example, what has happened in the conversation up to that point. For instance, in a news conference a dialogue containing the following question occurs, "What's your comment about Dean's confederate flag comment?" The next utterance is likely to address the question or at least change the distribution of all possible sentences.

Another relevant context considers the sentence or paragraph from its beginning. For instance, if we hear "it's illegal" at the beginning of the utterance by an angry customer, the expectation about whether we would later hear a litigation threat should be increased. Thus, in essence, the probability of the future sequence of words (composite words) noted as W is conditioned on the topic T, and the conversation up to now, including the current sentence and the previous sentences denoted as $W_{past}$, e.g., in a particular embodiment $P(W|W_{past},T)$. In this formulation $W_{past}$ and T serve as the context C.

Acoustic Modeling

Given the co-articulation affect on the acoustic realization, the model that takes into account longer context would be more accurate. Since the basic units, i.e., the composite words, are not limited to individual words, longer units across word boundaries can be utilized.

Confidence Level Estimation

The optimal decoding criterion according to the Bayes Decision Theory is to find the word sequence S with the highest posterior probability, given the acoustics vector sequence X and everything known (i.e., information gathered up to the point) before the decoding, which we label as C for context. That is, find the S with the highest $P(S|C,X)$. With a good estimate of the posterior probability, we can use it based on a cost function, which governs the tradeoff between recall/precision to decide whether a certain word sequence $S_1$ was spoken.

However, likelihood based decoders can not estimate this posterior probability, but a likelihood function $P(X|C,S_1)$. This leads to a sub-optimal confidence estimation that, in general, needs to be tweaked manually for each specific application.

The present invention provides a direct way to estimate the desired posterior probability. Specifically, for each composite word, or word sequence S, we denote an anti model $\underline{S}$ that covers all likely word sequences that are not S. Each likely word sequence has a similar length as S in the given time interval. We then estimate the desired posterior probability $$P(S|C,X)=P(X|C,S)P(S)/(P(X|C,S)+P(X|C,\underline{S})).$$

Since the denominator is in essence $P(X|C)$, we get an equality via Bayes law.

Preferably, $P(X|C,\underline{S})$ is estimated by finding acoustic similar sentences that will be a good approximation for the "anti model" $\underline{S}$. In an embodiment, $P(X|C,\underline{S})$ is estimated by running a call classification on unrelated acoustic data and taking the spoken sentences of the mistakes, i.e., false positives, as the "anti model" $\underline{S}$.

Classification and Natural Language Understanding (NLU)

Conventional word spotting or speech-to-text systems require a natural language understanding stage to figure out whether the spotted or recognized words are in the right sense or context. For instance, if an organization looks for litigation threats in its customer calls, a conventional system looking for the word "sue" would indiscriminately flag calls with spoken words such as "My neighbor Sue told me how great your company is." Subsequently, where applicable, a classification of the spotted or recognized words is then performed.

Given that the context of the domain is known, the event detection as described above looks for word sequences in which the desirable words are in the right sense/context as determined by the surrounding words, thereby advantageously eliminating the NLU stage commonly required in conventional word spotting and speech-to-text recognition systems.

Dynamic Language Modeling

The language model specifies, given a point in a call, conversation, or the like, the prior probabilities for each word sequence. Ideally, one would want to change this distribution after each event detection. In conventional speech-to-text recognition systems, it is almost impossible to do so, given the exponential numbers of word sequences recognized up to any point in several minute long conversations. In conventional word spotting systems, it is very difficult to automatically disambiguate the sense of the spotted word and from it to estimate the required change in the language model.

According to an aspect of the present invention, the event detection described above can associate each sequence of words with a state, e.g., user authentication, user complaint, and from it the appropriate language model for which this state can be utilized. The states can be discrete or continuous. For example, at a given point in time, based on prior expectations and everything that has been detected up to this point, we want to find the following two phrases:

"I want to cancel my credit card" and

"I want to renew my credit card."

With the present invention, each of these phrases would have a different probability if an angry or happy customer has been detected. This is possible in our approach because we can change the probabilities of the whole phrase based on categories found so far in the conversation, up to the given point in time. Thus, the posterior probability is also dynamically affected per events detected. This functionality enhances the accuracy and efficiency of the present invention over conventional word spotting based recognition systems in which the probability of a word is limited to the context of one or two previous words, as discussed before.

5. Exemplary Implementation

Set Up Stages:

Define Events and Classification Rules

The system enables a user to define or express an event by words and phrases. An event can be defined more precisely to include fields such as event name, confidence level, speaker, start time, end time. In some embodiments, the system further enables a user to define or express events by examples, for instance, by supplying several recordings instead of a list of words. In some embodiments, the system allows dynamic events, for instance, the customer pin number. In some embodiments, the system is programmed to enable a user to time mark the events.

Build Acoustic Models/Dictionary

The system translates the event list containing, for example, user-entered words and phrases, into inputs necessary for the event detection process, i.e., acoustic models, dictionary, etc. In some embodiments, the event detection process employs a word-spotting engine while preserving the context of the event spotted.

Classification Stages:
Perform speaker separation;
Perform event spotting/recognition; and
Perform call classification based on events detected.
An example of how a call can be processed/classified is as follows:
1) a call is recorded or reviewed in real time as an acoustical file (e.g., a standard wave file);
2) an acoustical speaker separation is performed to distinguish Speaker A from Speaker B;
3) word spotting is performed to detect certain words or phrases for a particular event based on the occurrence or non-occurrence of certain words or phrases, including user-entered words and phrases and system-generated semantically equivalent words and phrases;
4) each event is given a particular confidence level based on whether the event occurred;
5) an overall confidence level for the classification is then determined; and
6) the call is classified into one or more categories corresponding to the events detected, in accordance with the overall confidence level. The system or a user can optionally set a threshold value for the overall confidence level to control or ensure accuracy of the classification.

As one skilled in the art will understand, the present invention is not limited to classifying a call into an entire category. It can be practiced in a semi-automatic fashion, wherein only portions of a category, or particular events are verified/classified. Further, the present invention is not limited by what types of information it classifies. In addition to human-to-human telephone conversations, other implementations are possible, for example, classifying multimedia (audio/video) files containing speech data and/or audio features, human-to-machine conversations such as voice messages or recorded customer conversations with intelligent computer agents, Web-based conference/meetings such as Webinars, news/entertainment/sport live feeds/streams/broadcasts, and so on. Below we describe an embodiment particular useful in classifying, indexing, and searching large collection of human communication data. Within the context of the present invention, a human communication refers to any type of communication involving at least one human who provides, creates, generates, or otherwise participates part or all of the content of the communication.

6. Classifying, Indexing, and Searching Human Communications

As discussed before, conventional full transcription, phonetic transcription, and word spotting based classification systems as well as speech-to-text recognition systems are not well suited for searching, indexing, and categorizing large audio collections. In part this is because these systems require a separate interpretation stage, a NLU stage, or the like, before the classification can take place.

To address this issue, the present invention embeds an innovative functionality in a human communication information classification/indexing/search system. An important aspect of the invention is that this functionality integrates, i.e., essentially unifies, the recognition stage and the interpretation stage by extracting content directly from the audio/speech/multimedia files. All the knowledge and data that are required to perform at the interpretation phase are being utilized in the recognition phase to insure an overall better and more accurate process. The embodiment described below is applicable to any classification method that can be used to classify an audio file into a given set of categories and/or relevancy levels. Preferably, it is implemented with the classification method and system described heretofore.

In general, the integrated recognition/interpretation/classification method comprises the following steps:

1. Perform a topic classification with conversation modeling and language modeling on a target conversation (human communication) to find all of the relevant words, their sequences, their statistical correlation, and any other relevant information that needs to be found in the recognition stage and that would aid the recognition stage with information about the expected word sequence. The conversation modeling employs a statistical state machine describing all possible topic sequences in the conversation. The language modeling provides the distribution of relevant word sequences within a given topic. The topic classification can be performed utilizing any desirable classification method so long as it provides a list of target words, informative words among the target words, and the context of which to perform the recognition, e.g., word X is relevant only if words Y and Z are in proximity.

2. For every target word to be recognized, perform a semantic expansion as described above, taking into account the information obtained in stage 1. The system then automatically generates synonyms and semantically equivalent phrases.

3. Perform event detection and recognition as described above, taking into account the information obtained in stages 1 and 2 with the given context, i.e., target words, synonyms, informative words, system-generated semantically equivalent phrases, etc.

4. Run a desired topic classifier/categorizer over the recognition output from stage 3 to classify the conversation into a topic or several topics such as middle-east news report, US economic news, and health news for broadcast news recording and streams, or topics such as product feedback, service complaints, and sale inquiry for call center conversations. Note that there is no redundant output because the recognition stage (stage 3) is dictated by the topic classification stage (stage 1). Here the topics and categories are not the same or mutually exclusive. For instance, in addition to the topics mentioned above, additional categories might include those relevant to Mrs. Smith and high quality content categories.

This technique also allows for custom categories or dynamic models such as the intelligent "User Model" for a personal Web, as described in a pending U.S. patent application Ser. No. 09/597,975, which is assigned to the assignee of the present invention.

For classification purposes, the process can stop here. For ad hoc search purposes, the following steps are performed in addition to stages 1-4 above.

5. Perform a phonetic recognition in accordance with a language model specific to the found topic, taking into account all words and key phrases found in stage 3. Specifically, nothing needs to be done in places where words, phrases, and sentences have been found. The phonetic recognition is performed on the rest of the audio using a phone-based language model that reflects all of the relevant topics found in stage 4. This "selective" phonetic recognition is different from the conventional phonetic transcription approach in that there is no decision needs to be made every time the system finds a winning phone (or sub phone), i.e., "the transcribed phone." Rather, the system records and outputs the distribution over all likely phones (or any sub phone, syllable unit, band based unit).

As one skilled in the art can appreciate, the present invention can be practiced without having to classifying the calls into predefined topics first, i.e., performing only ad hoc searching with semantically expanded phrases containing the target word or words. Thus, in essence, an embodiment of the invention is directed to stages 5-7. Another embodiment of the invention is directed to a real-time ad hoc searching technique in which only stages 6 and 7 below are performed in real time, since they are the only ones depending on the user query. The rest of stages 1-5 can be done off-line, i.e., in indexing time or set-up stages.

6. Extend/expand each user query to all possible phrases (i.e., composite words) which contain the user query and/or semantically equivalent words as described above. Convert each appropriate phrase to a phone sequence (or a sub phone unit sequence) and find the likely matches in the audio or conversation using the indexing done in stage 5. Optionally, the system can perform composite word recognition in real-time (while the user is waiting) on the likely matches of the relevant composite words to achieve better accuracy.

7. To check the accuracy of the result, as a final step, perform a confidence level estimation based on the posterior probability of the recognized sentence. More specifically, the posterior probability is defined as $$P(S|C,X)=P(X|C,S)P(S|C)/P(X|C,S)P(S|C)+\text{sum}(\underline{S})\{(P(X|C,\underline{S})P(S|C))\}$$

where C=context, X=acoustics vector sequence, and S=sentence.

$\underline{S}$ is an anti model of S. In an embodiment, the system approximates all of the alternate sentences $\underline{S}$ by generating a fixed number of similar sentences to the hypothesized sentence S. To ensure the accuracy/efficiency and hence the quality of the search results, a user can optionally set a threshold value to control output of likely matches based on the confidence level, for example, discarding phrases with a confidence level of less than 0.8.

Figure 13:
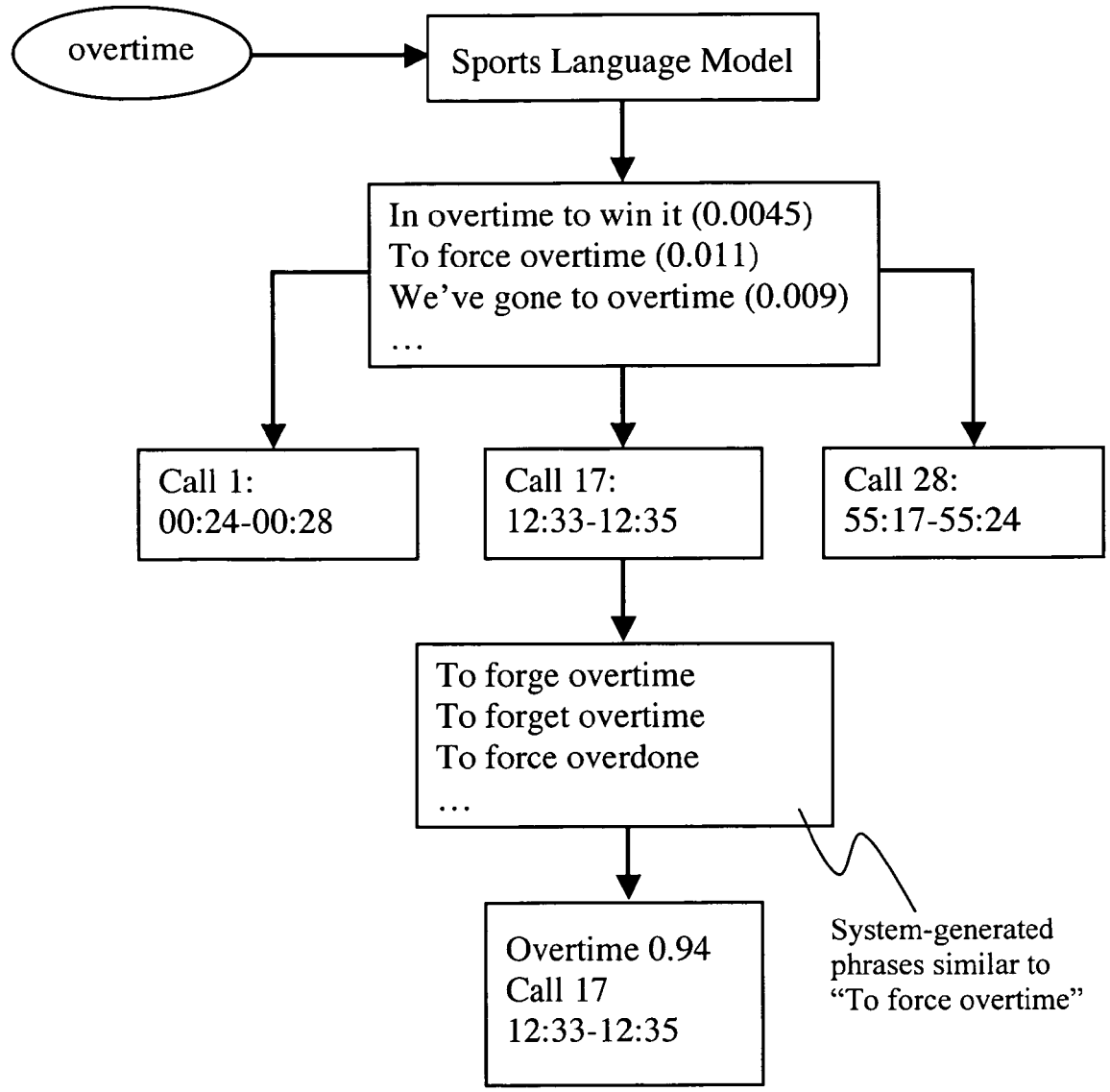
FIG. 13 is a flow chart illustrating certain steps involved in indexing a keyword, implementing an embodiment of the present invention.

FIG. 13 is a flow chart illustrating certain steps involved in indexing a target word as describe above. In this case, the pertinent call has been classified under the topic "sports" as described above in stages 1-4. As such, the Sports Language Model generates statistically likely contexts for the word "overtime", for example, "In overtime to win it,". "To force overtime," "We've gone to over time," etc. Naturally, for calls that are classified as belonging to different topics, different contexts are generated and considered accordingly.

Based on the phonetic recognition as described above in stage 5, the system finds several candidate calls (or speech documents) based on the acoustic model. Each of these calls, e.g., Call 1, Call 17, Call 28, etc., mentions the word "overtime" and is shown with respective time frame.

Based on these candidate calls, the system finds, generates, or otherwise provides matches of all likely expansions, for example, phrases such as "To forge overtime," "To forget overtime," "To force overdone," etc. are found to be similar to the detected phrase "To force overtime." Those that have high likelihood are considered potential hits and passed onto the posterior probability computation stage.

In the posterior probability computation stage, these similar phrases are considered spoken in the corresponding speech window. Using their matching likelihood, a posterior probability is computed. Depending upon the applicable threshold, the target word might be indexed. In the example shown in FIG. 13, the posterior probability of the detection of the term "overtime" in Call 17 between 12:35 and 12:35 is 0.94.

As one skilled in the art will appreciate, most digital computer systems can be installed with the present invention. To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the communication classification system described herein, it in effect becomes a special purpose computer particular to the present invention. The necessary programming-related techniques are well known to those skilled in the art and thus are not further described herein for the sake of brevity.

Computer programs implementing the present invention can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein.

Although the present invention and its advantages have been described in detail, it should be understood that the present invention is not limited to or defined by what is shown or described herein. The drawings, tables, and description disclosed herein illustrate technologies related to the invention, show examples of the invention, and provide examples of using the invention. Known methods, procedures, systems, elements, or components may be discussed without giving details, so to avoid obscuring the principles of the invention. As one of ordinary skill in the art will appreciate, various changes, substitutions, and alterations could be made or otherwise implemented without departing from the principles of the present invention. Accordingly, the scope of the present invention should be determined by the following claims and their legal equivalents.

We claim:

1. A computer-implemented method of processing and classifying a communication involving at least one human, said method comprising:
 processing by the computer said communication to detect one or more composite words in a given context C, wherein each composite word is a predefined sequence of words S pre-programmed as an atomic unit to prevent partial detection;
 estimating a posterior probability P(S|C,X), wherein X is an acoustics vector sequence and wherein said posterior probability P(S|C,X)=P(X|C,S)P(S)/P(X|C,S)+P(X|C,$\underline{S}$)), wherein S is an anti model of S;
 determining an overall confidence level of events expressed in said one or more composite words occurring in said communication based on said posterior probability; and classifying said communication into one or more categories based on detected events in accordance with said overall confidence level.

2. The method of claim 1, further comprising:
approximating said anti model with acoustically similar sentences.

3. The method of claim 2, further comprising:
performing a call classification on unrelated acoustic data; obtaining false positives; and
configuring said anti model with said false positives.

4. The method of claim 1, further comprising:
associating each composite word with a discrete or continuous state in accordance with a dynamic language model, wherein said dynamic language model specifies, given a point in said communication, prior probabilities for each composite word.

5. The method of claim 4, wherein said dynamic language model affects said posterior probability based on categories found in said communication up to said point.

6. The method of claim 1, further comprising:
enabling an end user to selectively review any of said events, said words or phrases, and said categories over a web browser application.

7. The method of claim 1, in which said events are linguistic events.

8. The method of claim 1, in which said events are non-linguistic events.

9. The method of claim 1, further comprising:
assigning each event with a confidence level based on its occurrence.

10. The method of claim 1, further comprising:
defining said events by examples, words, recordings, or user input.

11. The method of claim 1, further comprising:
enabling a user to define an event by name, confidence level, speaker, start time, and end time.

12. The method of claim 1, in which
said categories include one or more super-categories and one or more sub-categories.

13. The method of claim 1, further comprising:
enabling a user to create a category and define it in terms of words, phrases, sentences, events, logical relationship to another category, or a combination thereof.

14. The method of claim 13, further comprising:
automatically or semi-automatically expanding input from said user to generate computer output semantically equivalent to said user input.

15. The method of claim 14, further comprising:
associating said user input and said semantically equivalent computer output with said category.

16. The method of claim 13, further comprising:
enabling said user to provide or mark certain words as keywords belonging to said category, thereby instructing said computer to classify accordingly a communication containing one or more of said keywords.

17. The method of claim 16, further comprising:
automatically generating additional words, phrases, sentences, or a combination thereof that are semantically equivalent to said keywords.

18. The method of claim 17, further comprising:
consulting a knowledge base containing said additional words, phrases, sentences, or a combination thereof.

19. A digital computer system programmed to perform the method of claim 1.

20. A computer readable medium tangibly embodying a computer-executable program of instructions implementing the method of claim 1.

21. A system for processing and classifying a communication involving at least one human, said system comprising:
means for processing said communication to detect one or more composite words in a given context C, wherein each composite word is a predefined sequence of words S pre-programmed as an atomic unit to prevent partial detection;
means for estimating a posterior probability $P(S|C,X)$, wherein X is an acoustics vector sequence and wherein said posterior probability $P(S|C,X)=P(X|C,S)P(S)/P(X|C,S)+P(X|C,S))$, wherein S is an anti model of S;
means for determining an overall confidence level of events expressed in said one or more composite words occurring in said communication based on said posterior probability; and
means for classifying said communication into one or more categories based on detected events in accordance with said overall confidence level.

22. The system of claim 21, further comprising:
means for approximating said anti model with acoustically similar sentences.

23. The system of claim 21, further comprising:
means for performing a call classification on unrelated acoustic data;
means for obtaining false positives; and
means for configuring said anti model with said false positives.

24. The system of claim 21, further comprising:
means for associating each composite word with a discrete or continuous state in accordance with a dynamic language model, wherein said dynamic language model specifies, given a point in said communication, prior probabilities for each composite word, wherein said dynamic language model affects said posterior probability based on categories found in said communication up to said point.

25. The system of claim 21, further comprising:
means for enabling an end user to selectively review any of said events, said words or phrases, and said categories over a web browser application.

26. The system of claim 21, in which
said events are linguistic events.

27. The system of claim 21, in which
said events are non-linguistic events.

28. The system of claim 21, further comprising:
means for assigning each event with a confidence level based on its occurrence.

29. The system of claim 21, further comprising:
means for defining said events by examples, words, recordings, or user input.

30. The system of claim 21, further comprising:
means for enabling a user to define an event by name, confidence level, speaker, start time, and end time.

31. The system of claim 21, in which
said categories include one or more super-categories and one or more sub-categories.

32. The system of claim 21, further comprising:
means for enabling a user to supply an original phrase with one or more words.

33. The system of claim 32, further comprising:
means for analyzing said original phrase and identifying semantically important words thereof;
means for populating a list of semantically equivalent words for each semantically important word; and means for determining whether each semantically equivalent word is statistically the same in context as said original phrase.

34. The system of claim 32, further comprising:
means for automatically modifying the sentence structure of said original phrase to generate semantically equivalent phrases thereof.

35. The system of claim 32, further comprising:
means for automatically adding words that precede or trail said original phrase to generate longer phrases that preserve the semantic meaning thereof.

36. The system of claim 32, further comprising:
means for interacting with said user to learn about other phrases with which to interpret said original phrase; and
means for populating a list correlated with said original phrase to include said other phrases.

37. The system of claim 36, further comprising:
means for generating follow-up questions on said original phrase; and
means for displaying said follow-up questions to said user.

* * * * *